US006690823B2

United States Patent
Holt et al.

(10) Patent No.: US 6,690,823 B2
(45) Date of Patent: Feb. 10, 2004

(54) METHOD AND APPARATUS FOR PARTITIONING AN ARBITRARILY-SHAPED AREA

(75) Inventors: Gary R. Holt, Bell Canyon, CA (US); Edward Ratner, Sunnyvale, CA (US); David B. Kita, Milpitas, CA (US)

(73) Assignee: PTS Corporation, San Jose, CA (US)

( * ) Notice: Subject to any disclaimer, the term of this patent is extended or adjusted under 35 U.S.C. 154(b) by 0 days.

(21) Appl. No.: 10/062,574

(22) Filed: Jan. 31, 2002

(65) Prior Publication Data

US 2003/0142867 A1 Jul. 31, 2003

(51) Int. Cl.[7] .............................................. G06T 7/60
(52) U.S. Cl. ...................................... 382/173; 382/286
(58) Field of Search ................................ 382/173, 180, 382/195, 196, 197, 199, 203, 282, 286, 288

(56) References Cited

U.S. PATENT DOCUMENTS

| | | | | |
|---|---|---|---|---|
| 4,183,013 A | * | 1/1980 | Agrawala et al. | 340/146.3 AC |
| 4,896,279 A | * | 1/1990 | Yoshida | 364/559 |
| 5,319,720 A | * | 6/1994 | Yokoyama et al. | 382/8 |
| 5,889,892 A | * | 3/1999 | Saito | 382/293 |
| 6,307,964 B1 | * | 10/2001 | Lin et al. | 382/203 |

FOREIGN PATENT DOCUMENTS

| | | | |
|---|---|---|---|
| WO | WO 00/64167 A1 | 10/2000 | H04N/7/12 |
| WO | WO 00/77735 A1 | 12/2000 | G06T/5/00 |

OTHER PUBLICATIONS

John C. Russ, The image processing handbook; pp. 463–465, 1995, CRC Press, Inc., Boca Raton, Florida.

* cited by examiner

Primary Examiner—Andrew W. Johns
(74) Attorney, Agent, or Firm—Okamoto & Benedicto LLP

(57) ABSTRACT

In accordance with one embodiment, a processing method and apparatus is provided for partitioning exposed areas created by motion compensation. The partitioning creates sub-areas in shapes and sizes that may be effectively dealt with and efficiently compressed. The partitioning may divide an arbitrarily shaped area by "pinching," "slicing," and/or "cleaving" the area into manageable sub-areas. In accordance with another embodiment, a method and apparatus is provided for processing points in a bounded area to locate a medial axis. In accordance with another embodiment, an electronically-implemented method and apparatus is provided for processing a bounded two-dimensional area in an array of points to determine, for each point inside the area, a nearest boundary point outside the area as measured by a Euclidean distance.

21 Claims, 20 Drawing Sheets

Raster from left to right in each row, starting at the top row and ending at the bottom row.

At each interior point, consider boundary locations stored at adjacent points above and to left. Select closer boundary location in Euclidean distance. In event of a tie, select that of adjacent point above.

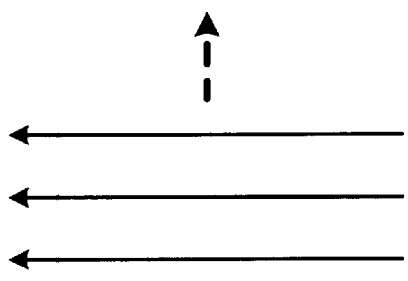

FIG. 8A

Raster from bottom to top in each column, starting at the left-most column and ending at the right-most column.

At each interior point, consider boundary locations already stored at the interior point and at adjacent points to left and below. Select closest boundary location in Euclidean distance. In event of a tie, select that of adjacent point to left, then below, and last the interior point.

FIG. 8B

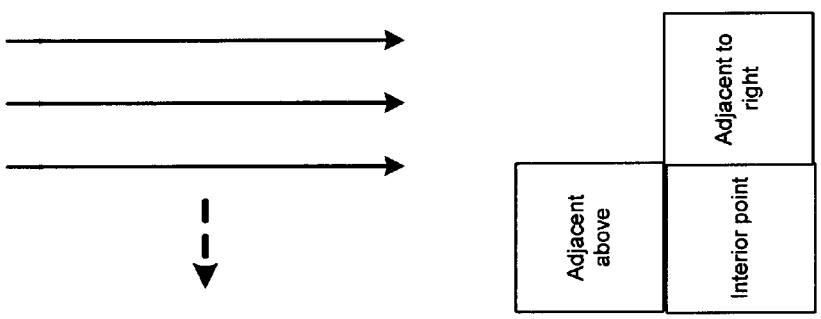

Raster from top to bottom in each column, starting at the right-most column and ending at the left-most column.

At each interior point, consider boundary locations already stored at the interior point and at adjacent points to right and above. Select closest boundary location in Euclidean distance. In event of a tie, select that of adjacent point to right, then above, and last the interior point.

METHOD AND APPARATUS FOR PARTITIONING AN ARBITRARILY-SHAPED AREA

CROSS-REFERENCE TO RELATED APPLICATION

The present invention is related to co-pending and co-owned U.S. patent application Ser. No. 09/591,438, filed Jun. 9, 2000 and entitled "Method and Apparatus for Digital Image Segmentation" with co-inventors Adityo Prakash, Edward R. Ratner, John S. Chen, and David L. Cook, the disclosure of which is incorporated herein by reference for all purposes. The present invention is also related to co-pending and co-owned U.S. patent application Ser. No. 09/550,705, filed Apr. 17, 2000 and entitled "Method and Apparatus for Efficient Video Processing" with co-inventors Adityo Prakash and Eniko F. Prakash, the disclosure of which is incorporated herein by reference for all purposes.

BACKGROUND OF THE INVENTION

1. Field of the Invention

The present invention relates generally to processing image and video data. More particularly, the present invention relates to partitioning an area of an image or video frame into sub-areas.

2. Description of the Background Art

In image and video processing, it is often desirable to divide an area of an image into sub-areas to facilitate processing. For example, for discrete cosine transform (DCT) processing, an image is typically divided into blocks, and DCT is applied to those blocks. When more specific shape information regarding regions within an image is available, then it makes sense to take advantage of the shape information, for example, for coding efficiency, improved filtering, matching, and so on. However, sometimes such regions may be too large or awkwardly shaped to process efficiently. Dividing such large or awkwardly shaped regions into sub-regions that reflect some of the geometric information available regarding the region would be highly desirable.

One example where such large or awkwardly shaped regions often arises is segment-based motion compensation where exposed areas are created. For example, as an object or segment moves from frame to frame, previously hidden areas become exposed. These exposed areas are typically arbitrarily-shaped and non-uniform. Hence, encoding exposed areas is problematic and typically rather inefficient. A solution dealing with exposed areas may also have wider applicability to other similar or related tasks in image processing.

SUMMARY

In accordance with one embodiment of the invention, a processing method and apparatus is provided for partitioning areas of an image. The partitioning creates sub-areas in shapes and sizes that may be effectively dealt with and efficiently compressed. The partitioning advantageously divides an arbitrarily shaped area by "pinching," "slicing," and/or "cleaving" the area into manageable sub-areas to facilitate further processing. Such pinching, slicing, and/or cleaving may be applied to the area in any order.

In accordance with another embodiment of the invention, a processing method and apparatus is provided for partitioning a bounded area into sub-areas by determining pinch cuts located in narrow regions near rapid changes in area width, and dividing the area into sub-areas separated by the pinch cuts. The pinch cuts advantageously facilitate further processing by separating either a narrow region from a wide region or two wide regions from each other.

In accordance with another embodiment of the invention, a processing method and apparatus is provided for placing slice cuts to partition a bounded two-dimensional area. The method and apparatus determines a medial axis comprising at least one medial line segment approximately midway between two boundary line segments, and places the slices approximately perpendicular to the medial line segment and spaced approximately evenly along the medial line segment. The slice cuts advantageously divide elongated areas into sub-areas that are typically more efficient to further process.

In accordance with another embodiment of the invention, a method and apparatus is provided for processing points in a bounded area to locate a medial axis. The method and apparatus determines a nearest boundary point outside the area corresponding to each point inside the area, finds adjacent points inside the area which have different corresponding nearest boundary points separated by at least a threshold arc length, generates paths between said adjacent points with different corresponding nearest boundary points, and locates the medial axis from amongst said paths. Locating a medial axis advantageously facilitates determination of the pinch and slice cuts for partitioning arbitrarily-shaped areas.

In accordance with another embodiment of the invention, an electronically-implemented method and apparatus is provided for processing a bounded two-dimensional area in an array of points to determine, for each point inside the area, a nearest boundary point outside the area as measured by Euclidean distances. This technique based on Euclidean distances may be considered to be superior to prior techniques based on Manhattan distances. The Euclidean distances advantageously facilitate locating the medial axis.

BRIEF DESCRIPTION OF THE DRAWINGS

Non-limiting and non-exhaustive embodiments of the present invention are described in the Figures, in which:

FIG. 6B is a diagram showing boundary locations stored at interior points after a first pass of processing in accordance with an embodiment of the invention;

FIG. 7B is a diagram showing boundary locations stored at interior points after a second pass of processing in accordance with an embodiment of the invention;

FIG. 8A diagrammatically illustrates a raster pattern and algorithm for processing interior points for a third pass in accordance with an embodiment of the invention;

FIG. 8B is a diagram showing boundary locations stored at interior points after a third pass of processing in accordance with an embodiment of the invention;

FIG. 9A diagrammatically illustrates a raster pattern and algorithm for processing interior points for a fourth pass in accordance with an embodiment of the invention;

FIGS. 10 and 11 are diagrams showing location of a medial axis in the example area in accordance with an embodiment of the invention;

DETAILED DESCRIPTION

Figure 1:
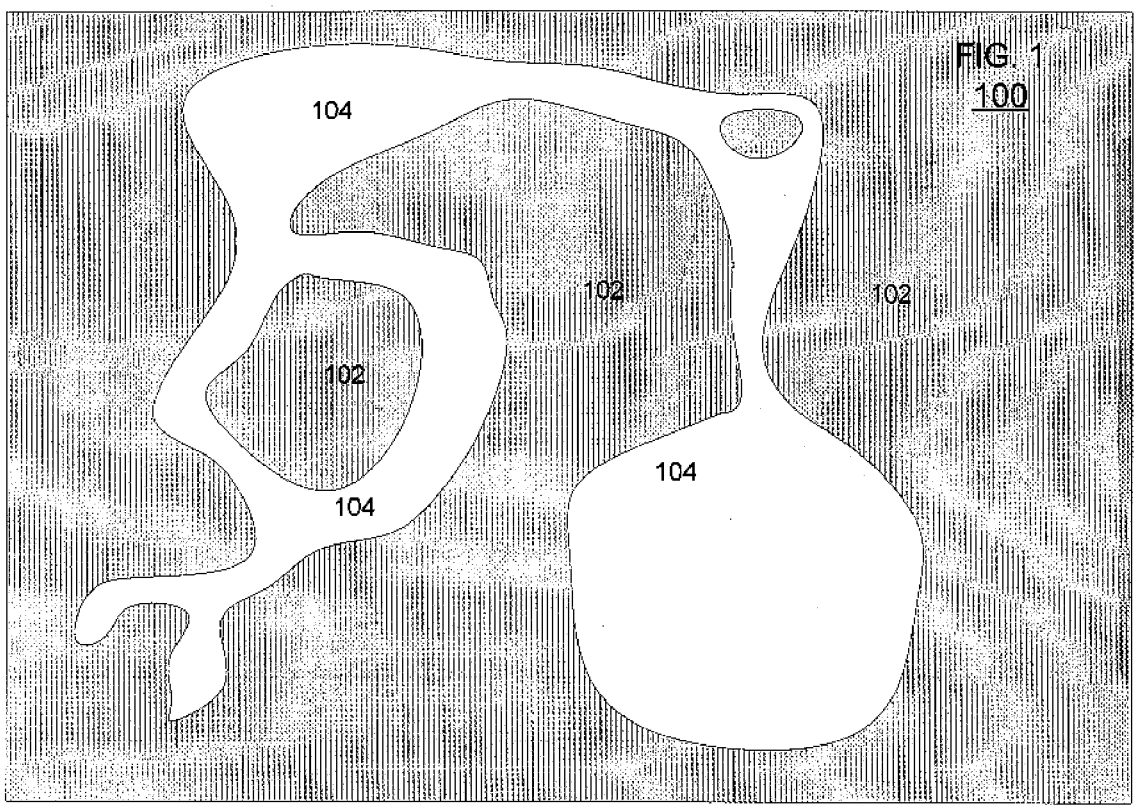
FIG. 1 is a drawing depicting an example arbitrarily-shaped area for purposes of illustration.

FIG. 1 is a drawing depicting an example arbitrarily-shaped area 104 for purposes of illustration. In one embodiment of the invention, the arbitrarily-shaped area 104 corresponds to an exposed area due to motion compensation in compressing a video frame 100. The area 104 may comprise points from such a video frame. Such points may be vertices between pixels of the video frame. A vertex lies in the center of four pixels. Alternatively, such points may be the pixels themselves, or such points may be mid-pixels. Mid-pixels lie between two pixels. Points not included in the arbitrarily-shaped area 104 may be called external points 102 and are shown as shaded in grey in FIG. 1. Points included in the area 104 may be called interior points. As illustrated in FIG. 1, the external points 102 may not only surround the area 104, but the external points 102 may also comprise islands surrounded by the area 104.

Figure 2:
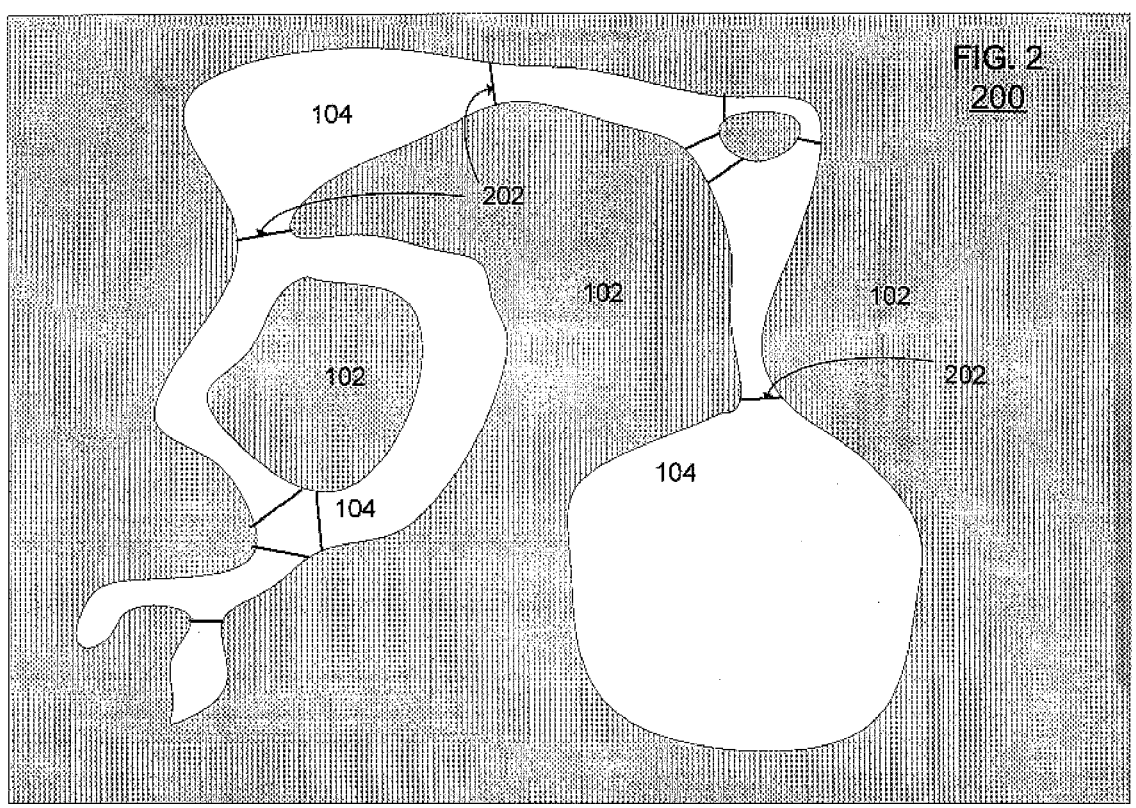
FIG. 2 is a drawing depicting "pinch" cuts dividing the example arbitrarily-shaped area in accordance with an embodiment of the invention.

FIG. 2 is a drawing depicting "pinch" cuts 202 dividing the example arbitrarily-shaped area 104 in accordance with an embodiment of the invention. The pinch cuts are made where a narrower portion of the area transitions to a wider portion area.

In accordance with one embodiment of the invention, the partitioning process begins with the pinch cuts. The pinch cuts are so called because one can imagine "pinching" off the wider portion at those locations. The process for determining pinch cuts 202 is described in further detail below in relation to FIGS. 12 and 13. In particular, there are two types of pinch cuts. The first type is described in relation to FIG. 12 and relates to pinching off a narrower portion from an adjacent wider portion. The second type is described in relation to FIG. 13 and relates to pinching off at a narrower portion between two wider portion. The example depicted in FIG. 2 includes both types of pinch cuts. The pinch cuts advantageously facilitate further processing by separating either a narrow region from a wide region or two wide regions from each other.

Figure 3:
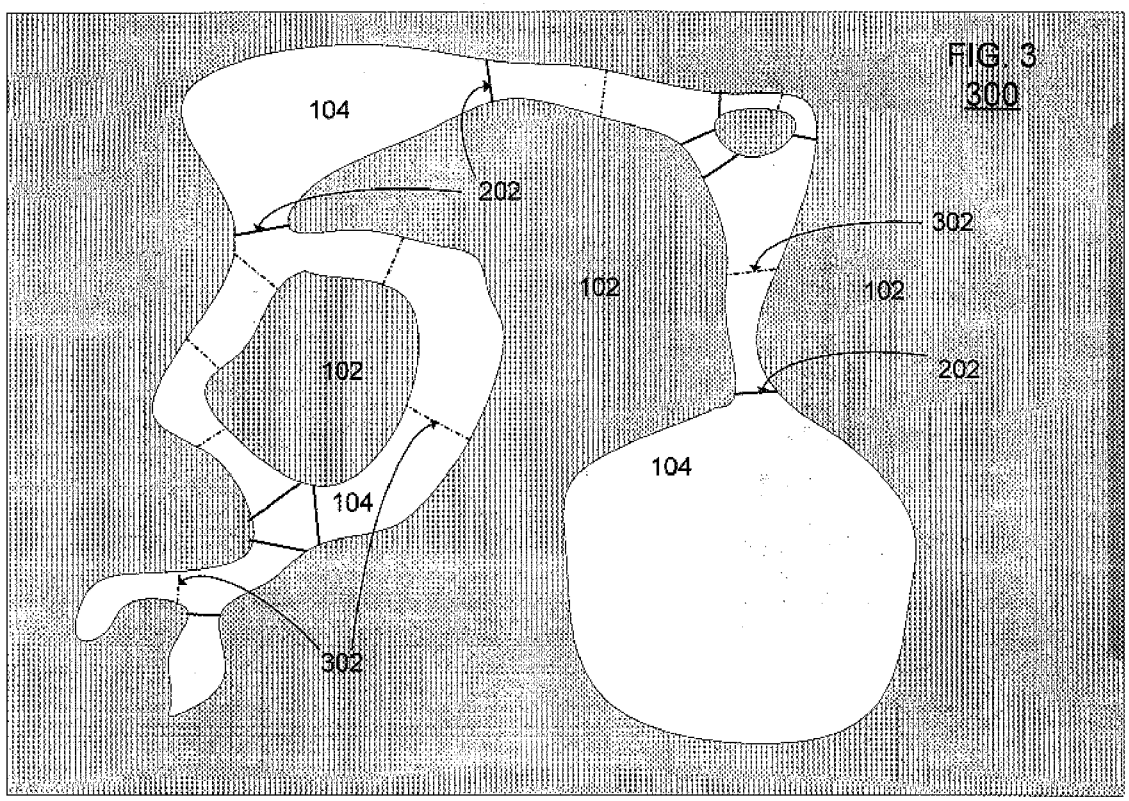
FIG. 3 is a drawing depicting both "slice" and "pinch" cuts dividing the example arbitrarily-shaped area in accordance with an embodiment of the invention.

FIG. 3 is a drawing depicting both "slice" and "pinch" cuts dividing the example arbitrarily-shaped area in accordance with an embodiment of the invention. In particular, FIG. 3 includes the pinch cuts 202 from FIG. 2 and adds slice cuts 302.

In accordance with one embodiment, after the pinch cuts 202 partition the arbitrarily-shaped area 104 into sub-areas, the slice cuts 302 further partition those sub-areas that are elongated in shape into portions that are less elongated. The slice cuts are so called as they slice an elongated shape in a fashion similar to the slicing of a loaf of bread. The process for determining slice cuts is described further below in relation to FIG. 14. The slice cuts advantageously divide elongated areas into sub-areas that are typically more efficient to further process. In accordance with one embodiment of the invention, the sub-areas divided by the slice cuts have aspect ratios (width:height) greater than a threshold aspect ratio. For example, the threshold aspect ratio may be two:one (2:1) such that the sub-areas themselves remain somewhat elongated.

Figure 4:
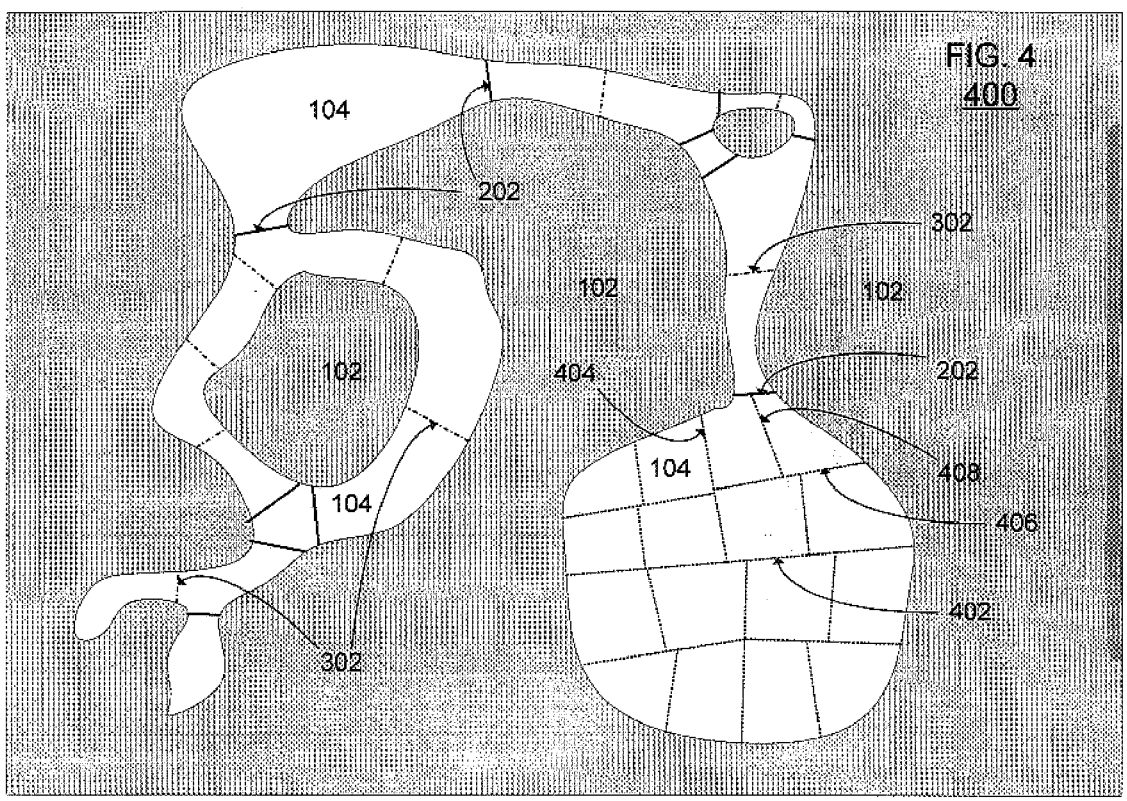
FIG. 4 is a drawing depicting "cleave," "slice," and "pinch" cuts dividing the example arbitrarily-shaped area in accordance with an embodiment of the invention.

FIG. 4 is a drawing depicting "cleave" 402–408, "slice" 302, and "pinch" 202 cuts dividing the example arbitrarily-shaped area in accordance with an embodiment of the invention. In particular, FIG. 4 includes the pinch 202 and slice 302 cuts from FIG. 3 and adds cleave cuts 402–408.

In accordance with one embodiment, after the pinch 202 and slice cuts 302 partition the arbitrarily-shaped area 104 into sub-areas, the cleave cuts 402–408 further partition those sub-areas that are larger than a threshold size. For example, those sub-areas with more pixels than a threshold number of pixels may be "cleaved." The cleave cuts 402–408 are so called as they cleave through those relatively large sub-areas. The cleave cuts may be accomplished electronically in an automated process, for example, in an integrated circuit or by software.

In the example depicted in FIG. 4, the relatively large sub-area near the bottom right is cleaved with a first-level cleave. The first-level cleave 402 goes horizontally cutting the sub-area into a top portion and a bottom portion. In one embodiment of the process, the first-level cleave 402 is horizontal if the sub-area to be cleaved is slightly longer in the top-to-bottom dimension than in the right-to-left dimension and is vertical if the sub-area to be cleaved is slightly longer in the right-to-left dimension than in the top-to-bottom dimension. If after the first-level cleave, the cleaved areas are still larger than a threshold size, then the process goes on to make second-level cleaves.

The second-level cleave 404 pointed-out in FIG. 4 vertically divides the top portion into left and right portions. In one embodiment of the process, the second-level cleave 404 is horizontal if the sub-area to be cleaved is slightly longer in the top-to-bottom dimension than in the right-to-left dimension and is vertical if the sub-area to be cleaved is slightly longer in the right-to-left dimension than in the top-to-bottom dimension. In the example depicted in FIG. 4, the second-level cleave 404 is vertical. A similar second-level cleave vertically divides the bottom portion. If after the second-level cleaves, the cleaved areas are still larger than a threshold size, then the process goes on to make third-level cleaves.

The third-level cleave 406 pointed out in FIG. 4 horizontally divides the right portion into a secondary top portion and a secondary bottom portion. In one embodiment of the process, the third-level cleave 406 is horizontal if the sub-area to be cleaved is slightly longer in the top-to-bottom dimension than in the right-to-left dimension and is vertical if the sub-area to be cleaved is slightly longer in the right-to-left dimension than in the top-to-bottom dimension. In the example depicted in FIG. 4, the third-level cleave 406 is horizontal. Similar other third-level cleaves horizontally divide analogous portions. If after the third-level cleaves, the cleaved areas are still larger than a threshold size, then the process goes on to make fourth-level cleaves.

The fourth-level cleave 408 pointed out in FIG. 4 vertically divides the right portion into a secondary left and right portions. In one embodiment of the process, the fourth-level cleave 408 is horizontal if the sub-area to be cleaved is slightly longer in the top-to-bottom dimension than in the right-to-left dimension and is vertical if the sub-area to be cleaved is slightly longer in the right-to-left dimension than in the top-to-bottom dimension. In the example depicted in FIG. 4, the fourth-level cleave 408 is vertical. Similar other fourth-level cleaves vertically divide analogous portions. If after the fourth-level cleaves, the cleaved areas are smaller than the threshold size, then the cleaving process ends. Otherwise, the process continues. This is the case in the example depicted in FIG. 4.

The following series of figures (FIGS. 5, 6A, 6B, 7A, 7B, 8A, 8B, 8C, 9A, 9B, and 9C) depict a methods for processing the interior pixels of an example area in accordance with embodiments of the invention. This processing may be done electronically, for example, in an integrated circuit or by software. The method results in determining, for each interior point, a nearest boundary point bordering the area as measured by Euclidean distances. This technique based on Euclidean distances may be considered to be superior to prior techniques based on Manhattan distances. The Euclidean distances advantageously facilitate locating the medial axis.

Figure 5:
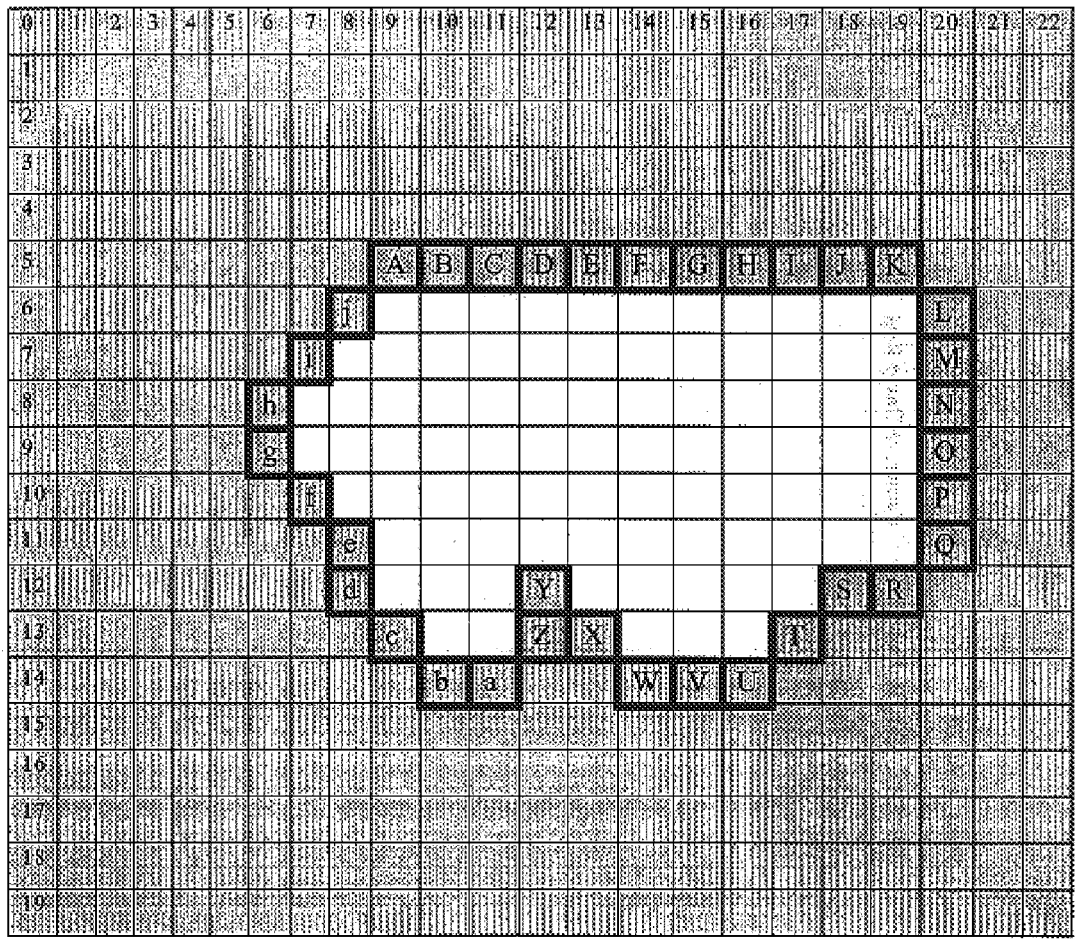
FIG. 5 is a diagram showing interior points and boundary locations of an example area for purposes of illustration.

FIG. 5 is a diagram showing interior points and boundary locations of an example area for purposes of illustration. The diagram shows twenty-three columns numbered 0 through 22 and twenty rows numbered 0 through 19. Points in the interior of the area are shown in white while points external to the area are shown in grey. The external points bordering the area are highlighted with darker borders on their representative blocks.

In a first step of the method for processing, these boundary points have their locations, more particularly coordinates of their locations, stored in a corresponding memory matrix configured for such storage. However, for the purpose of simplicity in the following description, the storage of such coordinates will be described as being stored at the points themselves. Also for the purpose of simplicity, the locations of the boundary points will be described by labels A, B, C, D, . . . , X, Y, Z, a, b, c, and so on, rather than coordinates. For example, in FIG. 5, the boundary point at row 5 and column 9 is labeled "A," and the boundary point at row 12 and column 8 is labeled "d."

The embodiment depicted in FIG. 5 does not include the location of "diagonal" boundary points. However, another embodiment of the invention includes storage of the location of the diagonal boundary points. For example, the diagonal boundary points in FIG. 5 include the points at row 5, column 20 (between K and L), at row 12, column 20 (between Q and R), at row 13, column 18 (between S and T), and so on. For example, the stored diagonal points may be utilized in processes where arc length is calculated, as described below in relation to FIG. 10.

Figure 6A:
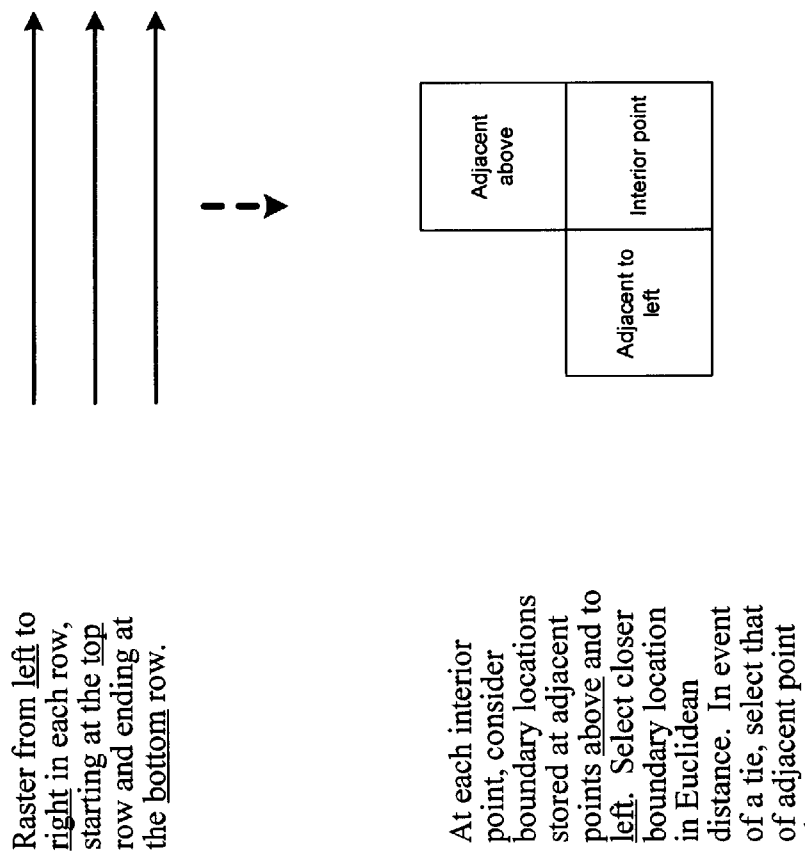
FIG. 6A diagrammatically illustrates a raster pattern and algorithm for processing interior points for a first pass in accordance with an embodiment of the invention.

FIG. 6A diagrammatically illustrates a raster pattern and algorithm for processing interior points for a first pass in accordance with an embodiment of the invention. The raster pattern gives the order in which the interior points are processed. The algorithm tells how each point is processed.

The arrows toward the top of FIG. 6A illustrate the raster pattern. The raster pattern starts from the top row and ends at the bottom row. Within each row, the raster pattern goes from point-to-point in left-to-right order.

The boxes toward the bottom of FIG. 6A illustrate the algorithm for processing interior points. At each interior point, the boundary locations stored at adjacent points above and to the left of the interior point are considered. Euclidean distances from those two boundary locations to the interior point are calculated. More accurately, the square of the Euclidean distances are calculated to avoid the unnecessary step of taking a square root. The closer (in terms of Euclidean distance) of the two boundary locations is selected for storage at the interior point. In event of a tie in Euclidean distances, the boundary location stored at the adjacent point above is selected.

The square of a Euclidean distance may be calculated by i) squaring the difference in x-coordinate between a boundary location and the interior point, ii) squaring the difference in y-coordinate between the boundary location and the interior point, and iii) summing the squares. For example, in FIG. 5, the square of the Euclidean distance between the boundary location "j" at row 6, column 8 and the interior point at row 8, column 10 is eight (8), so the Euclidean distance itself would be the square root of eight or 2.8284.

The Euclidean distance differs from a so-called Manhattan distance. The Manhattan distance may be calculated by summing the absolute values of the differences in x-coordinate and y-coordinate. For example, in FIG. 5, the Manhattan distance between the boundary location "j" at row 6, column 8 and the interior point at row 8, column 10 is 2+2=4.

Figure 6B:
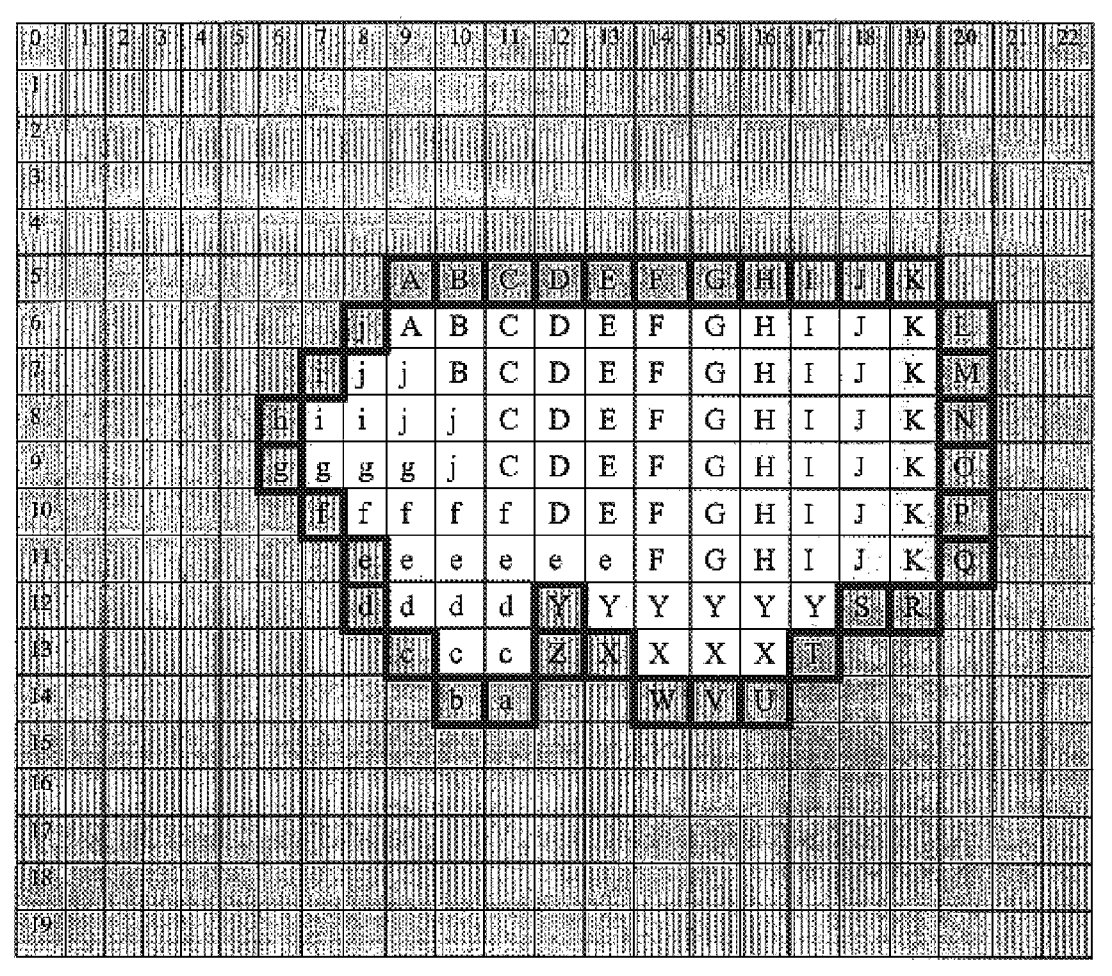

FIG. 6B is a diagram showing boundary locations stored at interior points after a first pass of processing in accordance with the raster pattern and algorithm of FIG. 6A. The boundary locations stored at the interior points are indicated by the label of the boundary location. For example, boundary location "A" is stored at the first processed point at row 6, column 9, and boundary location "X" is stored at the last processed point at row 13, column 16.

After the first pass, the stored boundary locations at the internal points do not yet correspond to the nearest boundary points. For example, the boundary location "Y" is stored at row 12, column 16, but the nearest boundary location for that point is actually "T".

Figure 7A:
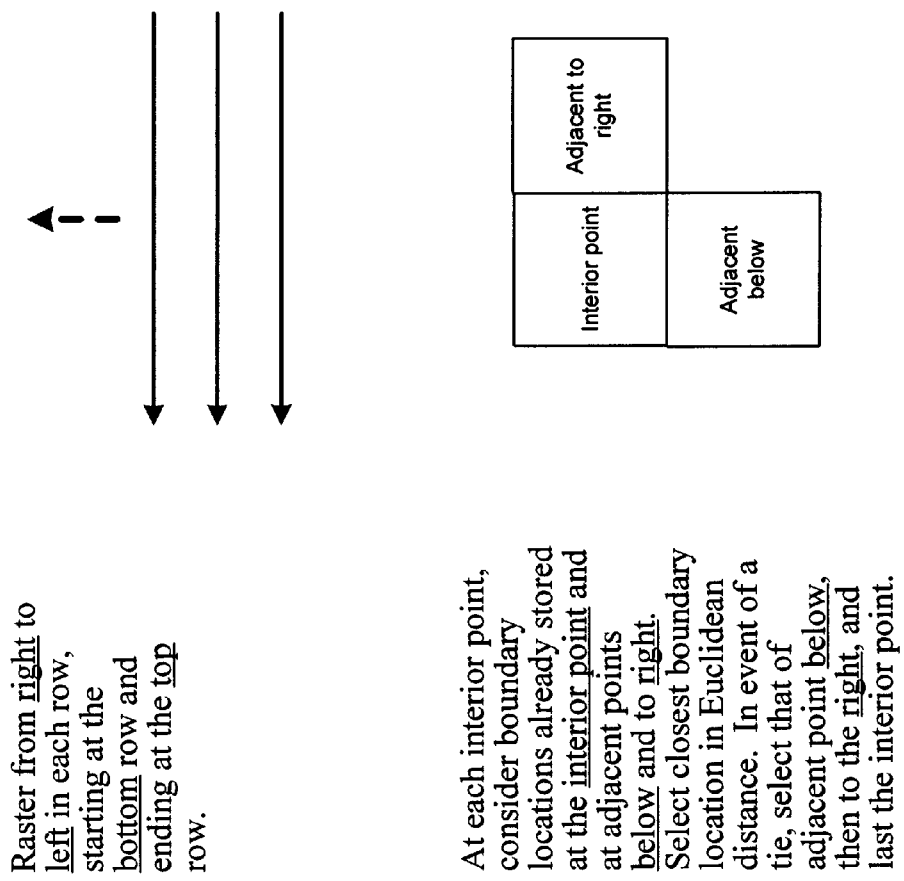
FIG. 7A diagrammatically illustrates a raster pattern and algorithm for processing interior points for a second pass in accordance with an embodiment of the invention.

FIG. 7A diagrammatically illustrates a raster pattern and algorithm for processing interior points for a second pass in accordance with an embodiment of the invention. The raster pattern gives the order in which the interior points are processed. The algorithm tells how each point is processed.

The arrows toward the top of FIG. 7A illustrate the raster pattern. The raster pattern starts from the bottom row and ends at the top row. Within each row, the raster pattern goes from point-to-point in right-to-left order.

The boxes toward the bottom of FIG. 7A illustrate the algorithm for processing interior points. At each interior point, the boundary locations stored at adjacent points below and to the right of the interior point are considered. Euclidean distances squared from those two boundary locations to the interior point are calculated. In addition, the boundary location already stored at the interior point is considered.

The closer (in terms of Euclidean distance) of the three boundary locations is selected for storage at the interior point. In event of a tie in Euclidean distances, the boundary location stored at the adjacent point below has highest priority for selection, the boundary location stored at the adjacent point to the right has middle priority for selection, and the boundary location stored at the interior point has lowest priority for selection.

Figure 7B:
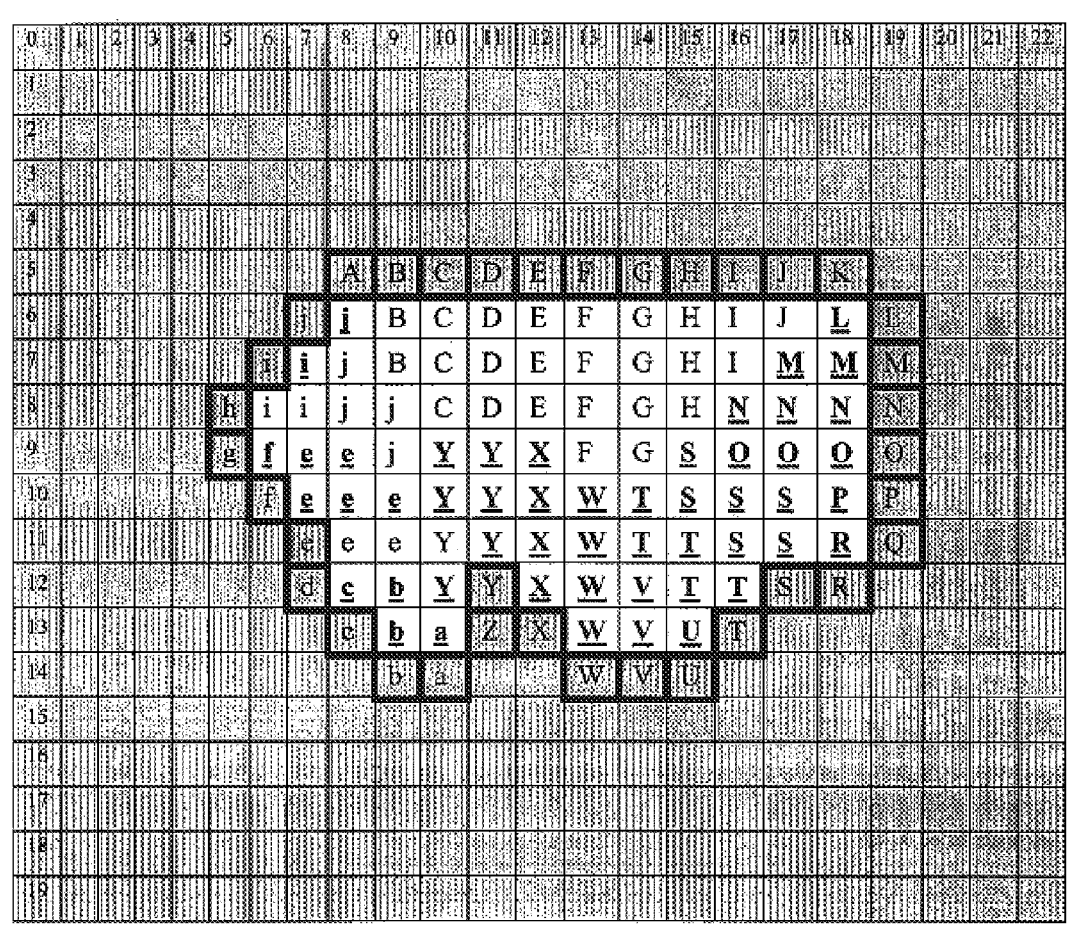

FIG. 7B is a diagram showing boundary locations stored at interior points after a second pass of processing in accordance with the raster pattern and algorithm of FIG. 7A. For example, boundary location "U" is stored at the first processed point at row 13, column 16, and boundary location "j" is stored at the last interior point at row 6, column 9. The stored boundary locations that changed as a result of the second pass are highlighted in FIG. 7B by bold and underline.

After the second pass, the stored boundary locations at the internal points are in better correspondence with the nearest boundary points. For example, the boundary location "T" is now stored at row 12, column 16. However, the stored boundary locations still do not correspond exactly with the nearest boundary points. For example, the boundary location "e" is stored at row 9, column 7, but the nearest boundary location for that point is actually "f".

FIG. 8A diagrammatically illustrates a raster pattern and algorithm for processing interior points for a third pass in accordance with an embodiment of the invention. The raster pattern gives the order in which the interior points are processed. The algorithm tells how each point is processed.

The arrows toward the top of FIG. 8A illustrate the raster pattern. The raster pattern starts from the left-most column and ends at the right-most column. Within each column, the raster pattern goes from point-to-point in bottom-to-top order.

The boxes toward the bottom of FIG. 8A illustrate the algorithm for processing interior points. At each interior point, the boundary locations stored at adjacent points to the left of and below the interior point are considered. Euclidean distances squared from those two boundary locations to the interior point are calculated. In addition, the boundary location already stored at the interior point is considered. The closer (in terms of Euclidean distance) of the three boundary locations is selected for storage at the interior point. In event of a tie in Euclidean distances, the boundary location stored at the adjacent point to the left has highest priority for selection, the boundary location stored at the adjacent point below has middle priority for selection, and the boundary location stored at the interior point has lowest priority for selection.

Figure 8B:
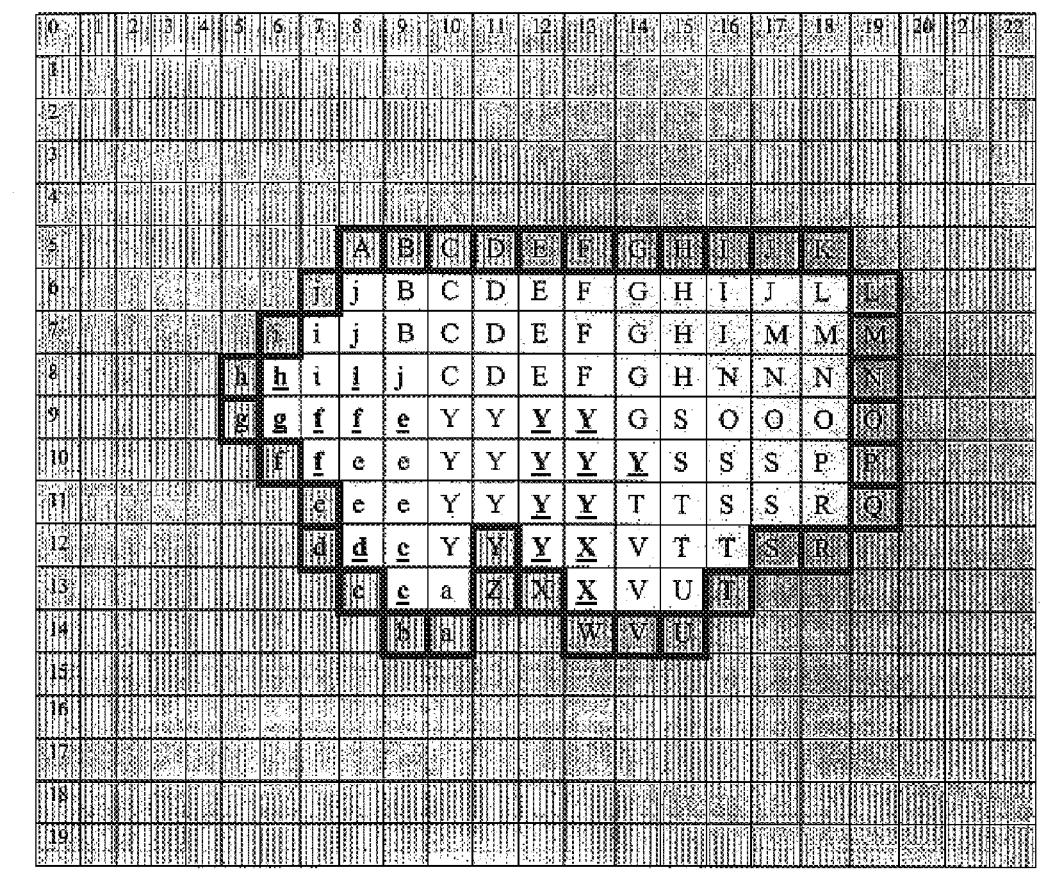

FIG. 8B is a diagram showing boundary locations stored at interior points after a third pass of processing in accordance with the raster pattern and algorithm of FIG. 8A. For example, boundary location "g" is stored at the first processed point at row 9, column 6, and boundary location "L" is stored at the last processed point at row 6, column 18. The stored boundary locations that changed as a result of the third pass are highlighted in FIG. 8B by bold and underline.

After the third pass, the stored boundary locations at the internal points are in even better correspondence with the nearest boundary points. For example, the boundary location "f" is now stored at row 9, column 7. In the actual example shown in FIG. 8B, the stored boundary locations do correspond with nearest boundary points. However, this may not be the case for other differently shaped areas.

Figure 8C:
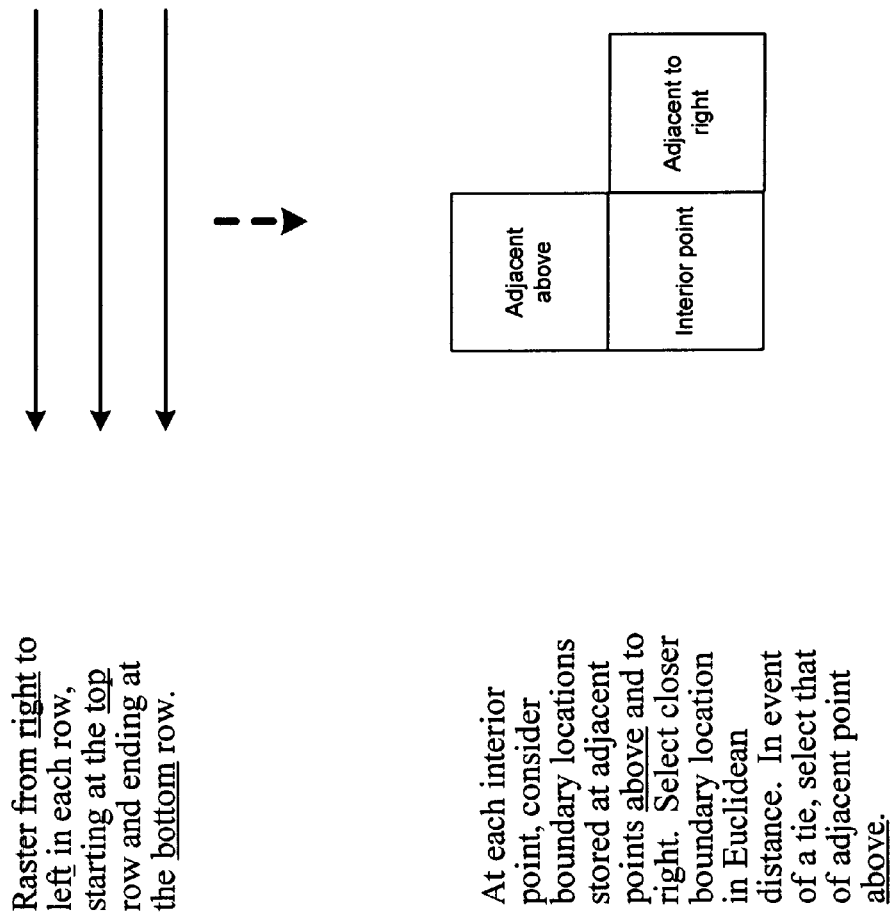
FIG. 8C diagrammatically illustrates a raster pattern and algorithm for processing interior points for a third pass in accordance with another embodiment of the invention.

FIG. 8C diagrammatically illustrates a raster pattern and algorithm for processing interior points for a third pass in accordance with another embodiment of the invention. The raster pattern and algorithm in accordance with the embodiment of FIG. 8C differs from the raster pattern and algorithm in accordance with the embodiment of FIG. 8A.

Like the raster pattern for the first pass shown in FIG. 6A, the raster pattern for the third pass in FIG. 8C starts from the top row and ends at the bottom row. However, unlike the raster pattern in FIG. 6A, the raster pattern in FIG. 8C goes from point-to-point in right-to-left order within each row.

The boxes toward the bottom of FIG. 8C illustrate the algorithm for processing interior points. At each interior point, the boundary locations stored at adjacent points above and to the right of the interior point are considered. Euclidean distances squared from those two boundary locations to the interior point are calculated. In addition, the boundary location already stored at the interior point is considered. The closer (in terms of Euclidean distance) of the three boundary locations is selected for storage at the interior point. In event of a tie in Euclidean distances, the boundary location stored at the adjacent point above has highest priority for selection, the boundary location stored at the adjacent point to the right has middle priority for selection, and the boundary location stored at the interior point has lowest priority for selection.

FIG. 9A diagrammatically illustrates a raster pattern and algorithm for processing interior points for a fourth pass in accordance with an embodiment of the invention. The fourth pass in accordance with FIG. 9A may be applied after a third pass in accordance with FIG. 8A.

The arrows toward the top of FIG. 9A illustrate the raster pattern. The raster pattern starts from the right-most column and ends at the left-most column. Within each column, the raster pattern goes from point-to-point in top-to-bottom order.

The boxes toward the bottom of FIG. 9A illustrate the algorithm for processing interior points. At each interior point, the boundary locations stored at adjacent points to the right of and above the interior point are considered. Euclidean distances from those two boundary locations to the interior point are calculated. In addition, the boundary location already stored at the interior point is considered. The closer (in terms of Euclidean distance) of the three boundary locations is selected for storage at the interior point. In event of a tie in Euclidean distances, the boundary location stored at the adjacent point to the right has highest priority for selection, the boundary location stored at the adjacent point above has middle priority for selection, and the boundary location stored at the interior point has lowest priority for selection.

Figure 9B:
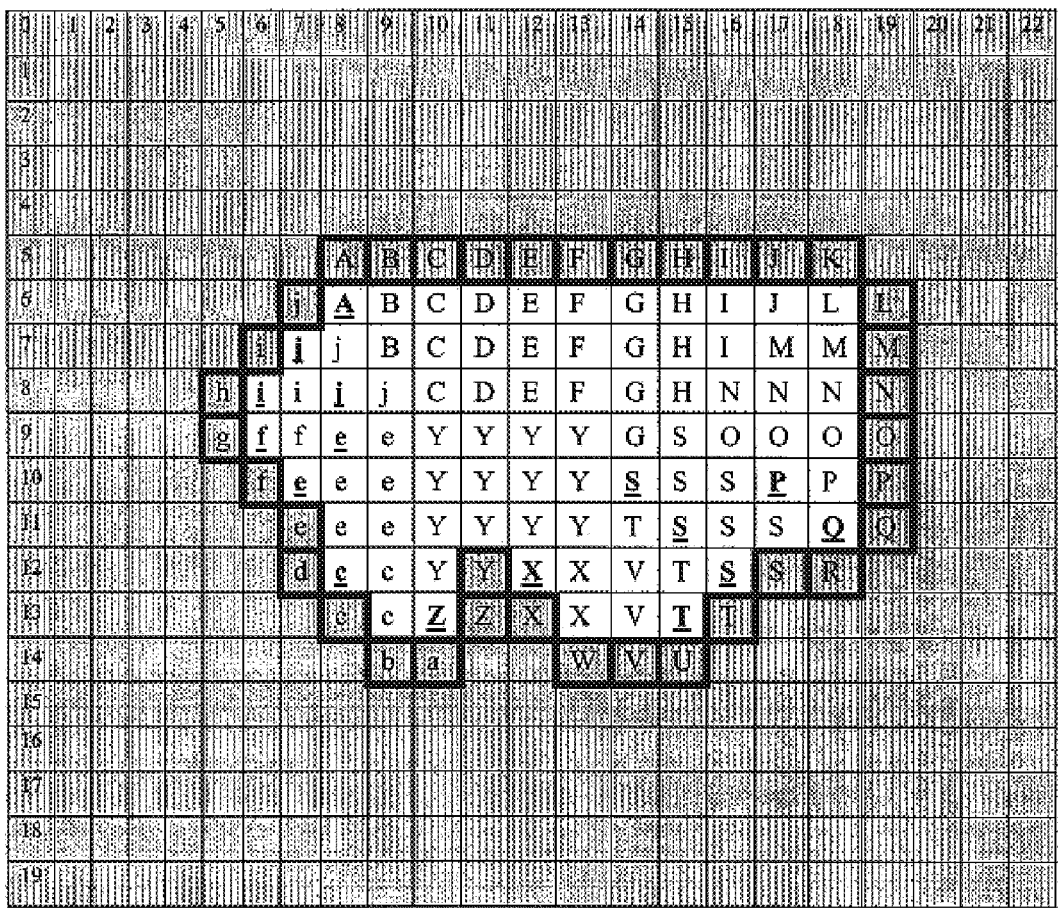
FIG. 9B is a diagram showing boundary locations stored at interior points after a fourth pass of processing in accordance with an embodiment of the invention.

FIG. 9B is a diagram showing boundary locations stored at interior points after a fourth pass of processing in accordance with the raster pattern and algorithm of FIG. 9A. For example, boundary location "L" is stored at the first processed point at row 6, column 18, and boundary location "f" is stored at the last processed point at row 9, column 6. The stored boundary locations that changed as a result of the fourth pass are highlighted in FIG. 9B by bold and underline.

After the fourth pass, the applicant believes that the stored boundary locations at the internal points should correspond with the nearest boundary points. This is the case in the example shown in FIG. 9B. Note that for this particular example, the changes as a result of the fourth pass merely switch between two equally nearest boundary points, but that may not be the case for other differently shaped areas. If the stored boundary locations at the internal points do not correspond exactly with the nearest boundary points, then it should at least be very close to corresponding with the nearest boundary points.

Figure 9C:
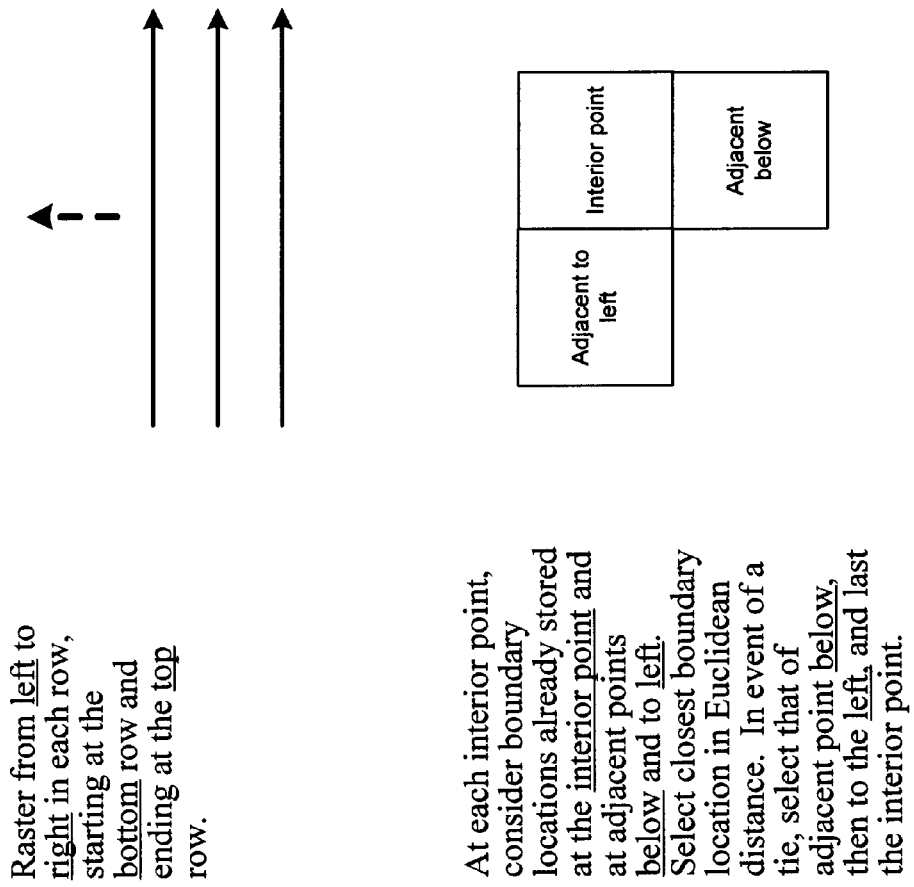
FIG. 9C diagrammatically illustrates a raster pattern and algorithm for processing interior points for a fourth pass in accordance with another embodiment of the invention.

FIG. 9C diagrammatically illustrates a raster pattern and algorithm for processing interior points for a fourth pass in accordance with another embodiment of the invention. The fourth pass in accordance with FIG. 9C may be applied after a third pass in accordance with FIG. 8C.

Like the raster pattern for the second pass shown in FIG. 7A, the raster pattern for the fourth pass in FIG. 9C starts from the bottom row and ends at the top row. However, unlike the raster pattern in FIG. 7A, the raster pattern in FIG. 9C goes from point-to-point in left-to-right order within each row.

The boxes toward the bottom of FIG. 9C illustrate the algorithm for processing interior points. At each interior point, the boundary locations stored at adjacent points below and to the left of the interior point are considered. Euclidean distances squared from those two boundary locations to the interior point are calculated. In addition, the boundary location already stored at the interior point is considered. The closer (in terms of Euclidean distance) of the three boundary locations is selected for storage at the interior point. In event of a tie in Euclidean distances, the boundary location stored at the adjacent point below has highest priority for selection, the boundary location stored at the adjacent point to the left has middle priority for selection, and the boundary location stored at the interior point has lowest priority for selection.

Other embodiments may use similar steps to determine, for each interior point (vertex or pixel) in an area, a nearest boundary point bordering the area as measured by Euclidean distance. For example, one alternate embodiment may switch the order of the second and third passes, such that the first pass of FIG. 6A is followed by the third pass of FIG. 8A, then the second pass of FIG. 7A, and lastly the fourth pass of FIG. 9A. Other alternate embodiments may use other orderings or orientations of the passes.

Figure 10:
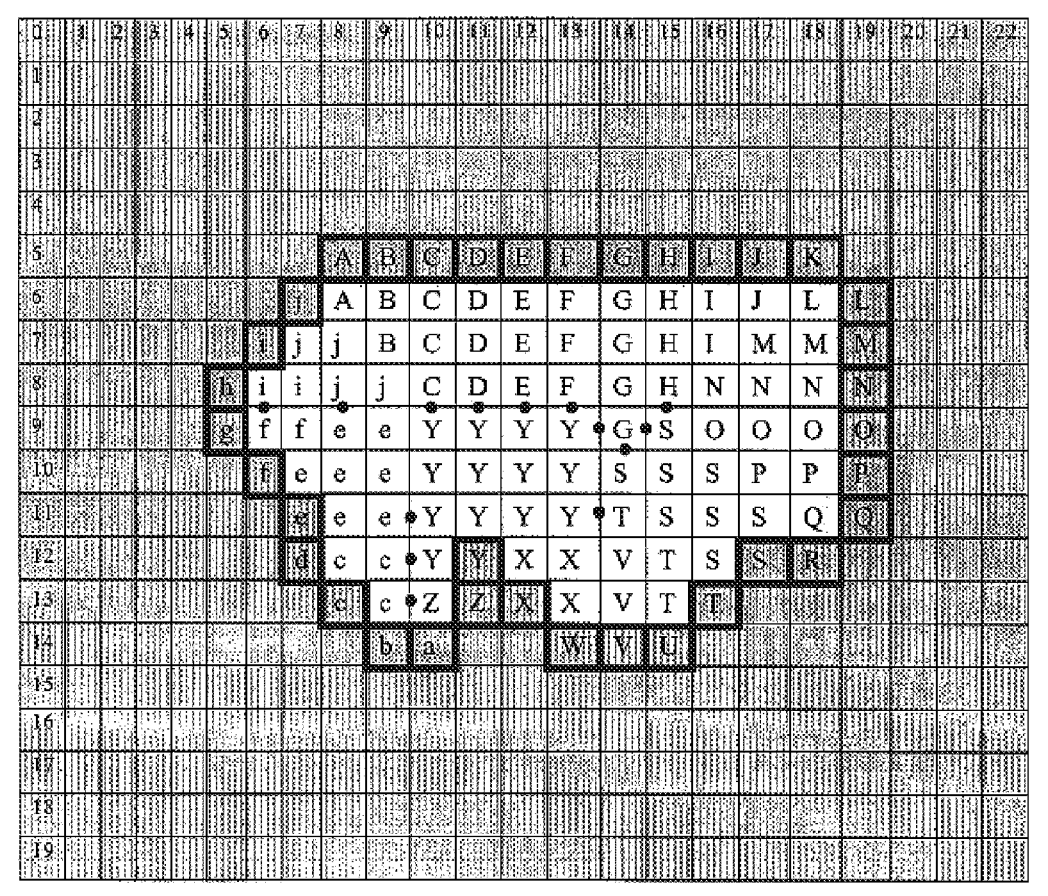
Figure 11:
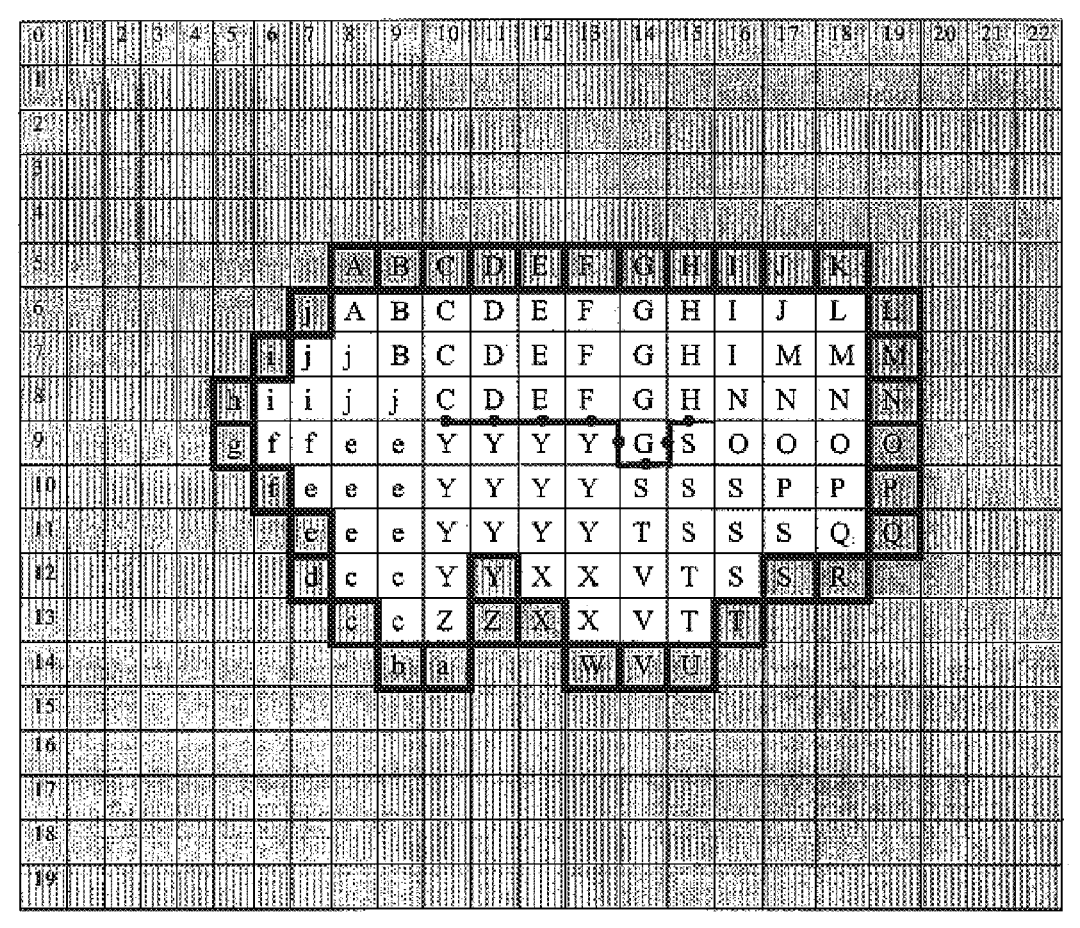

FIGS. 10 and 11 are diagrams showing location or determination of a medial axis in the example area in accordance with an embodiment of the invention. This determination may be done electronically in an automated process, for example, in an integrated circuit or by software. Locating a medial axis advantageously facilitates determination of the pinch and slice cuts for partitioning arbitrarily-shaped areas.

FIG. 10 depicts using the stored boundary locations at interior points to determine each pair of adjacent points that satisfy two criteria. The first criterion is for the adjacent points to have different nearest boundary points. The second criterion is for the arc length between the two nearest boundary pixels should be more than a threshold arc length. In one embodiment, the arc length is measured the minimum number of points along the boundary between the two nearest boundary pixels. For example, including diagonal points along the boundary (not labeled in FIG. 10), the arc length would be twenty-two (22) points to go from C to Y. The threshold arc length may be variable such that it increases in proportion with increasing distance from the adjacent points to the nearest boundary points. With such proportionality, the second criterion becomes, in effect, basically equivalent to the arc between the two nearest boundary points being greater than a threshold angle as measured from a mid-point between the two adjacent points. The particular example depicted in FIG. 10 used a threshold angle of one-hundred twenty (120) degrees.

Each pair of adjacent points that satisfy the above two criteria are indicated in FIG. 10 by a black dot at the mid-point between the pair of adjacent points. Next, paths may be generated to connect neighboring pairs of adjacent points into paths or chains. For example in FIG. 10, the chain of eight pairs starting at column 10, rows 8 and 9 and ending at column 15, rows 8 and 9 may be connected. Also, the chain of three pairs starting at row 11, columns 9 and 10 and ending at row 13, columns 9 and 10 may be connected. In one embodiment of the invention, paths or chains that are less than a threshold path length are not considered in locating or determining a medial axis. For the example shown in FIG. 10, the threshold path length may be five. This would mean that chains of four units or less in length would not be considered, where a unit in length is equal to the distance between two nearest neighbor points. The result of such a threshold path length is shown in FIG. 11.

FIG. 11 shows the single chain longer than the threshold path length. The remaining chain is the chain of eight pairs starting at column 10 between rows 8 and 9 and ending at column 15 between rows 8 and 9. The chain includes a "jog" around the interior pixel at row 9, column 14. In one embodiment of the invention, the medial axis for the bounded area is selected to be that remaining chain of pairs.

In accordance with another embodiment of the invention, the medial axis may be "thinned" in a process that may be called skeletonization. As described in the following, this thinning may be accomplished using a two-pass algorithm. In a first pass, medial axis points are identified as candidate points for potential removal from the medial axis if their removal would preserve connectivity between medial axis points in an immediate vicinity. Specifically, the eight (8) points surrounding a medial axis point are considered. For example, consider points 1–4 and 6–9 surrounding medial axis point 5, as depicted below:

1 2 3
4 5 6
7 8 9

Suppose that points 1, 5, and 9 have been labeled as medial axis points but no others have been. In this case, point 5 cannot be removed from the medial axis because it would disconnect 1 and 9. However, suppose points 1, 2, 3, and 5 have all been labeled as medial axis points. In that case, removing point 5 has no effect on the connectivity because there is still a path among these 9 points from 1 to 3. So, in the first pass, medial points are identified which are candidate points for removal.

In the second pass, a second connectivity check is used to determine which candidate points may actually be removed while preserving medial axis connectivity. The second connectivity check is not redundant for the following reason. Using the numbering above, suppose points 1, 2, 3, and 5 are medial axis points. Both 2 and 5 will be labeled as candidates for removal since if either one is removed, there is still a path connecting 1 and 3. However, if point 2 is removed, then point 5 cannot also be removed because otherwise no path would be left to connect 1 and 3. (If only a single pass was used in skeletonization, paths in single directions may be completely removed. For example, if we scan over the points from left to right, deleting any points which aren't necessary for connectivity, then if there is a horizontal line that is a single point wide, it will get removed point by point, until there's nothing left of it.) In the example shown in FIG. 11, skeletonization may be used thin the medial axis from two-points thick to one-point thick. After skeletonization, the medial axis may comprise six points from row 9, column 10 to row 9 column 15.

Figure 12:
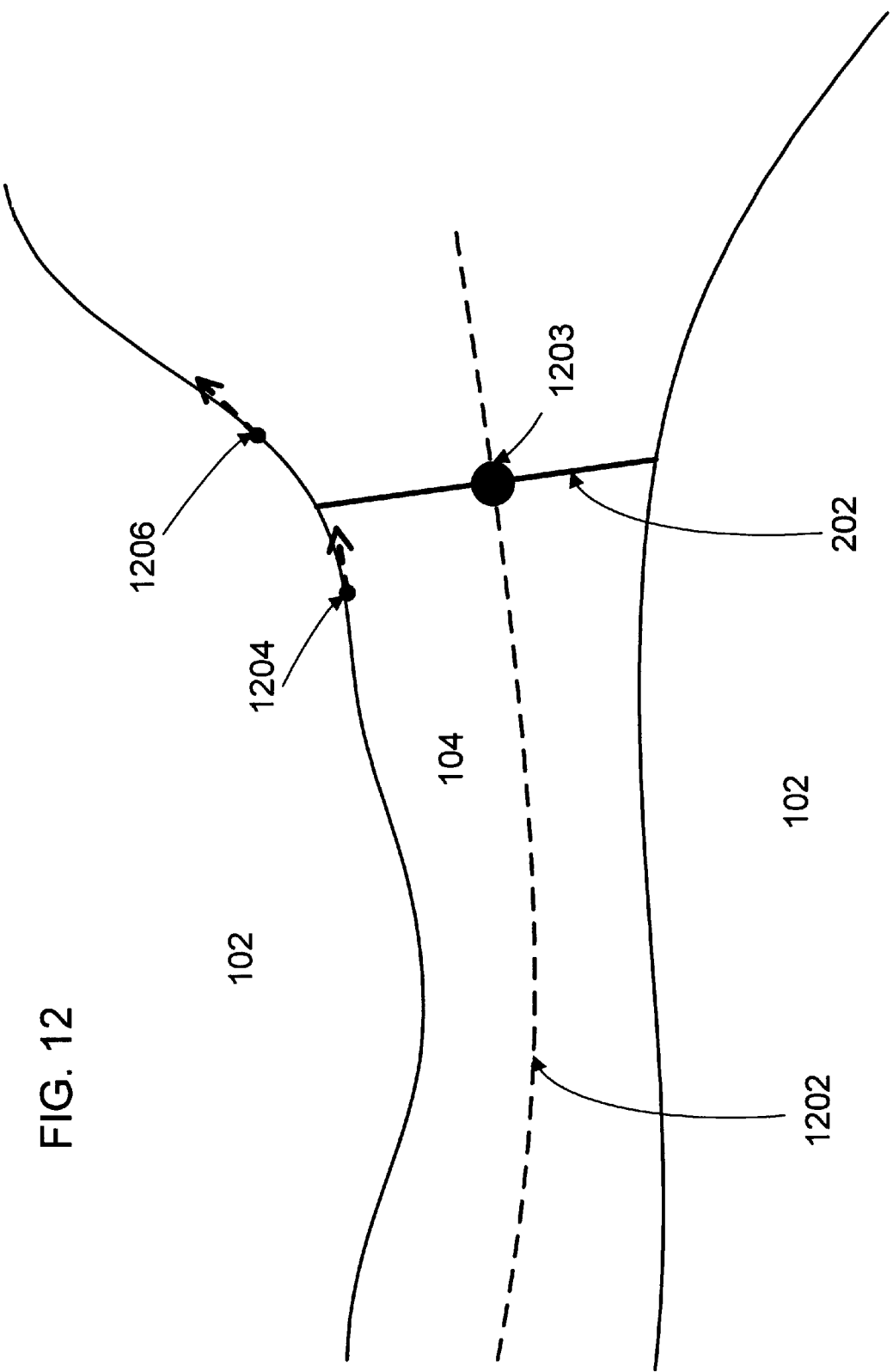
FIG. 12 illustrates in a conceptual way the determination of a pinch cut between a narrow area and a wide area in accordance with an embodiment of the invention.

FIG. 12 illustrates in a conceptual way the determination of a pinch cut between a narrow region and a wide region in accordance with an embodiment of the invention. This determination may be done electronically in an automated process, for example, in an integrated circuit or by software. Such a pinch cut advantageously facilitates further processing by separating a narrow region from a wide region.

A section of a bounded area 104 is shown in between two boundary regions 102 above and below it. Also shown is a medial axis 1202 going through that section of the bounded area 104. The medial axis 1202 may be determined, for example, using the algorithms and processes described above in relation to FIGS. 5 through 11.

A conceptual summary the process for determining the location of pinch cuts is given as follows. Consider a candidate cut point 1203 located as shown in FIG. 12. To the left of the point 1203 is shown a first slope 1204 that represents a simplified measure of the rate of change of distance between the medial axis to the boundary on the left of the point 1203. To the right of the point 1203 is shown a second slope 1206 that represents a simplified measure of the rate of change of distance between the medial axis to the boundary on the right of the point 1203. A pinch cut 202 is determined to be made at the candidate cut point 1203 when the difference between the first 1204 and second 1206 slopes is at a local maximum and when no other cuts are within the near vicinity. The pinch cut 202 may be made perpendicular or nearly perpendicular to the medial axis 1202 at the point 1203.

In accordance with a specific embodiment of the invention, the process of determining the pinch cuts may be implemented as follows. Consideration of each candidate point includes "walking" away from the candidate point in four pairs of opposing directions. The four pairs being left (West or W) and right (East or E), up (North or N) and down (South or S), NW and SE, and NE and SW.

A walk proceeds as follows. Consider a walk to the right (E). A next step in the walk is determined by looking for another medial axis point that is either E, NE, or SE of the current point. If there is more than one choice, we take the one that has the largest distance to the nearest boundary point. Each walk proceeds until it reaches a threshold number of "steps" away from the point under consideration (the candidate point). The threshold number may increase with increasing distance from the point under consideration to the nearest boundary point. The threshold number may also have an absolute minimum number of steps, for example, five (5) steps.

As the walk away from the point under consideration proceeds, a mean distance to the nearest boundary is computed. The mean distances may be a weighted mean distance with the weight increasing for points further away from the point under consideration. Hence, for each pair of opposing directions, a first mean distance is computed from the walk in one direction, and a second mean distance is computed from the walk in the opposing direction.

In accordance with the specific embodiment, a candidate point is removed from consideration for a pinch cut if the following criterion is met.

$$\min[\text{mean\_distance\_1}(i), \text{mean\_distance\_2}(i)] < \text{distance}(i) + 0.5$$

where where min [a,b] indicates the smaller value of a or b, mean_distance_1(i) represents the first mean distance for candidate point "i", mean_distance_2(i) represents the second mean distance for candidate point i, distance(i) represents the distance from candidate point i to the nearest boundary point, and distances are given in units such that a unit is equal to the distance between nearest neighbor points. The above criterion eliminates candidate points in regions where the tube-like shape of the region is becoming steadily narrower. In other embodiments, a similar criterion may be used, if necessary.

Using the two mean distances, a score is then computed for the appropriateness of a pinch cut at the candidate point. For example, in one specific implementation, the formula for the score may be:

$$\text{score} = \frac{\max[\text{mean\_distance\_1}(i), \text{mean\_distance\_2}(i)] - \text{distance}(i)}{\max[\text{distance}(i), 5]}$$

where max [a,b] indicates the larger value of a or b, mean_distance_1(i) represents the first mean distance for candidate point "i", mean_distance_2(i) represents the second mean distance for candidate point i, distance(i) represents the distance from candidate point i to the nearest boundary point, and distances are given in units such that a unit is equal to the distance between nearest neighbor points. Other similar formulas may be used to compute the score with similar effect.

The score is computed for each of the four pairs of opposing directions, and the maximum score for the candidate point is stored on a list. The list may also include which pair of opposing directions generated the maximum score for the candidate point. Once the list includes the maximum score for each medial axis point, then the list may be sorted by score in descending order such that the highest score is at the top of the list and the lowest score is at the bottom of the list. Going down the list, cuts are made at candidate points with sufficiently high scores, provided that no other nearby cuts exist that are approximately parallel to the candidate cut. Cuts may be made with a line perpendicular to the pair of opposing directions that generated the maximum score for the candidate point.

Figure 13:
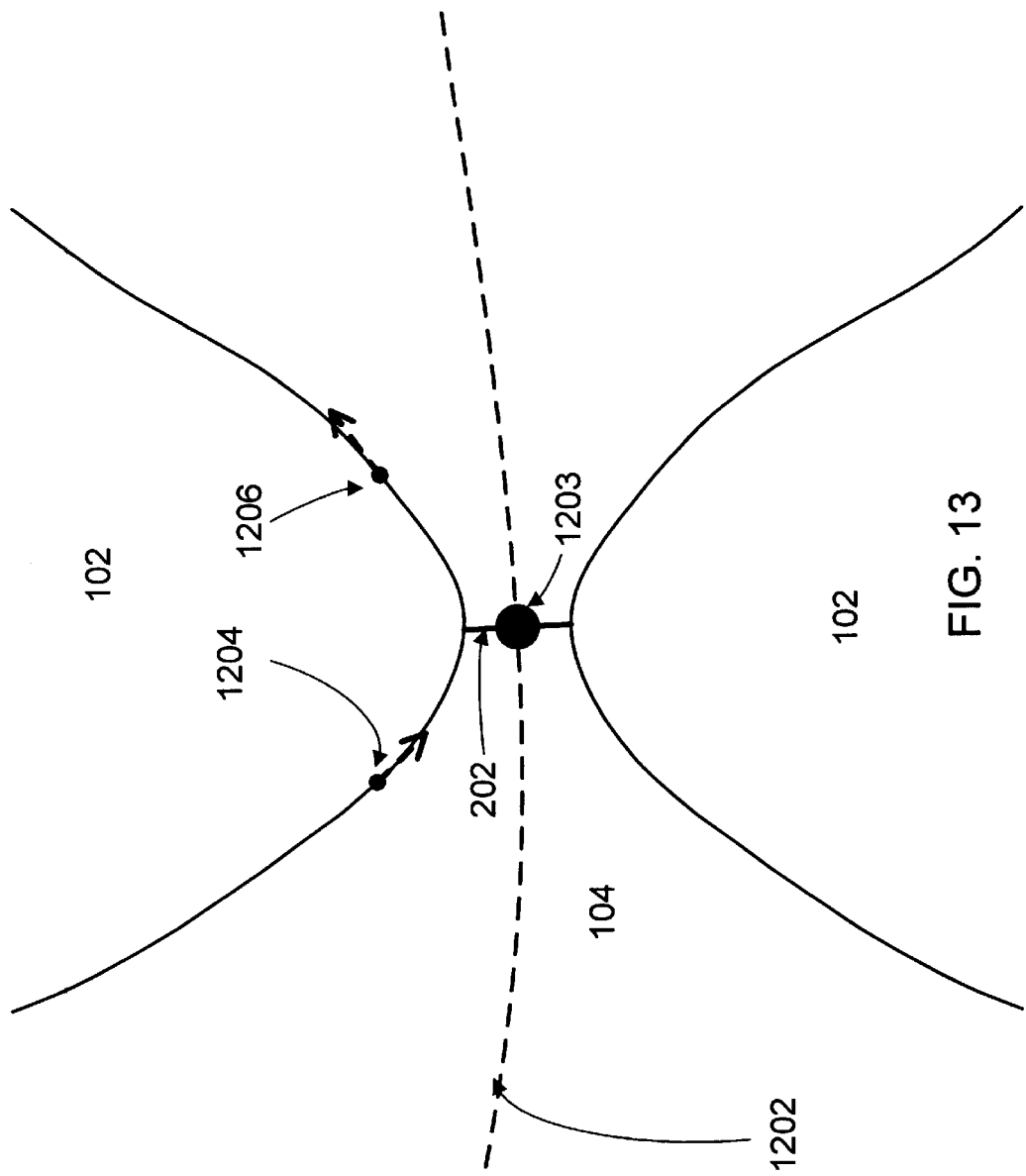
FIG. 13 illustrates in a conceptual way the determination of a pinch cut between two wide regions in accordance with an embodiment of the invention.

FIG. 13 illustrates in a conceptual way the determination of a pinch cut between two wide regions in accordance with an embodiment of the invention. Again, this determination may be done electronically in an automated process, for example, in an integrated circuit or by software. Such a pinch cut advantageously facilitates further processing by separating two wide regions. The actual algorithm or process for determining the pinch cut of FIG. 13 may be the same algorithm or process for determining the pinch cut of FIG. 12. In the case of FIG. 12, the difference in slopes is between a near flat slope (of the narrow region on the left) and a positively inclined slope (of the wide region on the right). In the case of FIG. 13, the difference in slopes is between a negatively inclined slope (of the first wide region on the left) and a positively inclined slope (of the second wide region on the right).

Figure 14:
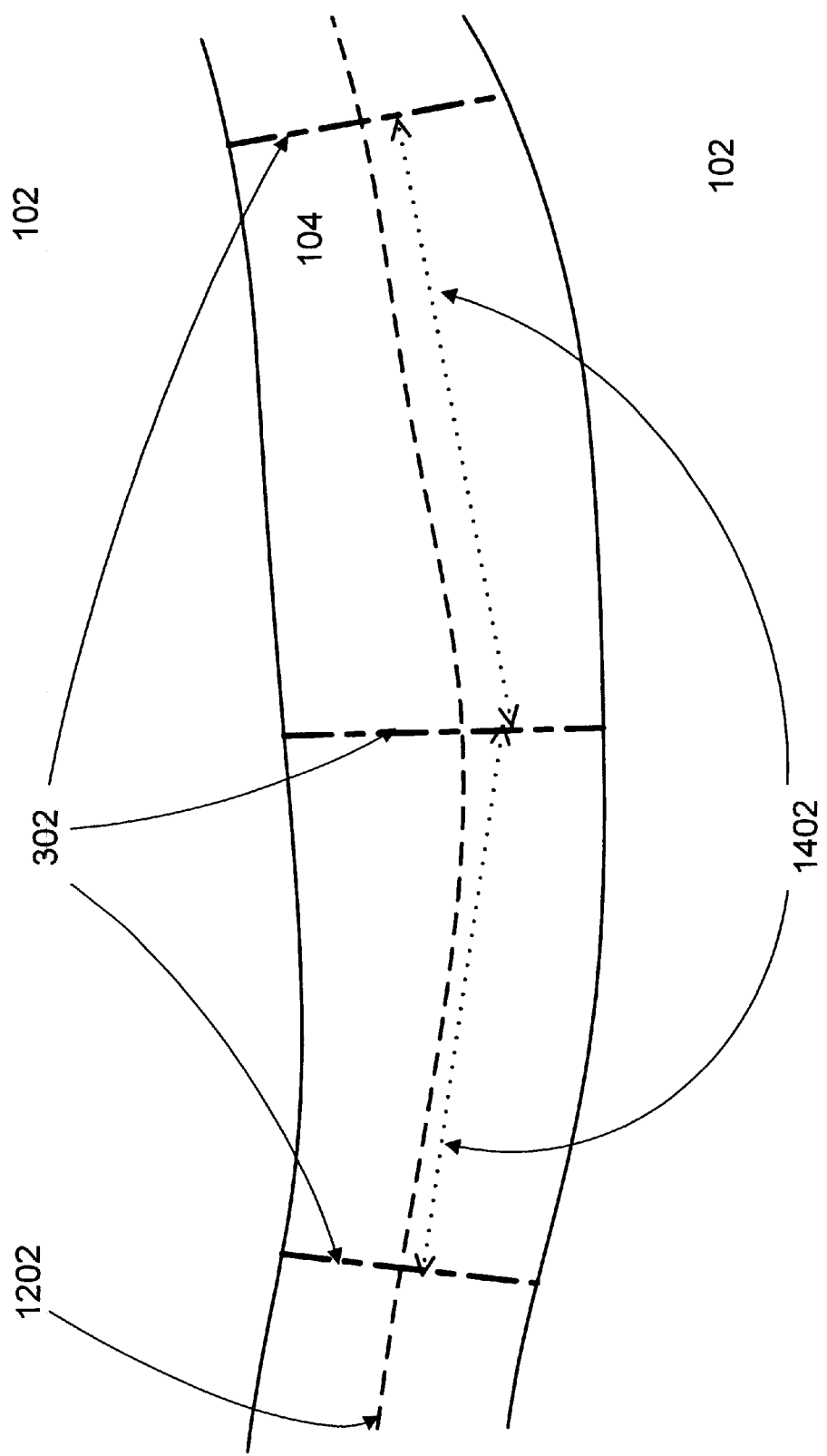
FIG. 14 illustrates in a conceptual way the determination of slice cuts in accordance with an embodiment of the invention.

FIG. 14 illustrates in a conceptual way the determination of slice cuts in accordance with an embodiment of the invention. This determination may be done electronically in an automated process, for example, in an integrated circuit or by software. The slice cuts advantageously divide elongated areas into sub-areas that are typically more efficient to further process. In FIG. 14, a relatively elongated region of the area 104 is shown in between two boundary regions 102 above and below the elongated region. Also shown is a medial axis 1202 going through the elongated region. The medial axis 1202 may be determined, for example, using the algorithms and processes described above in relation to FIGS. 5 through 11.

A conceptual summary of the process for determining the slice cuts is given as follows. The process includes walking along the medial axis. The slice cuts 302 may be located at evenly or approximately evenly spaced 1402 points along the medial axis 1202. The slice cuts may be oriented to be perpendicular or approximately perpendicular to the medial axis 1202. In accordance with one embodiment of the invention, the sub-areas divided by the slice cuts have aspect ratios (width:height) greater than a threshold aspect ratio. For example, the threshold aspect ratio may be two:one (2:1) such that the sub-areas themselves remain somewhat elongated.

In accordance with a specific embodiment of the invention, the process of determining the slice cuts may be implemented as follows. The process proceeds in two phases. In the first phase, the process walks along the medial axis to find out how long it is. In the second phase, the process re-walks along the medial axis, placing cuts evenly. In placing the evenly-spaced slice cuts, a minimum aspect ratio for the sub-areas may be required. The aspect ratio may be defined to be the width to height ratio, where the width may be the length of the medial axis in the candidate sub-area, and the height may be the length of the candidate slice cut. For example, the minimum aspect ratio may be two (2). The two phases are necessary to make sure that the final slice cut is an appropriate distance from the end of a medial axis chain.

Note that, in accordance with one embodiment of the invention, a medial axis point may not be considered for the purpose of determining slice cuts when, at that point, the magnitude of the rate of change of the distance to the nearest boundary is greater than a threshold rate of change. For example, the threshold rate of change may be one-half (½) of a unit of distance to the nearest boundary per unit of distance along the medial axis, where a unit of distance equals to the distance between two nearest neighbor points. This would prevent slice cuts from being located at axis points where the nearest boundary was sloped more steeply than a threshold level.

Reference throughout this specification to "one embodiment" or "an embodiment" or the like means that a particular feature, structure, or characteristic described in connection with the embodiment is included in at least one embodiment of the present invention. Thus, the appearances of the phrases "in one embodiment" or "in an embodiment" or the like in various places throughout this specification are not necessarily all referring to the same embodiment. Furthermore, the particular features, structures, or characteristics may be combined in any suitable manner in one or more embodiments.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A processing method for partitioning a bounded area into sub-areas, the method comprising:
   determining pinch cuts located in narrow regions near rapid changes in boundary slope; and
   dividing the area into sub-areas separated by the pinch cuts,
   wherein at least one pinch cut separates a relatively wide sub-area from a relatively narrow sub-area.

2. A processing method for partitioning a bounded area into sub-areas, the method comprising:
   determining pinch cuts located in narrow regions near rapid changes in boundary slope; and
   dividing the area into sub-areas separated by the pinch cuts,
   wherein the pinch cuts are determined by comparing at least one slope of a boundary line segment on one side of a potential pinch cut with at least one slope of the boundary line segment on another side of the potential pinch cut.

3. The method of claim 2, wherein the slopes of the boundary line segment comprise inclinations relative to a medial axis.

4. The method of claim 3, wherein the medial axis comprises a line segment approximately midway between two boundary line segments.

5. A processing method for placing slices to partition a bounded two-dimensional area, the method comprising:
   determining a medial axis comprising at least one medial line segment approximately midway between two boundary line segments; and
   placing the slices approximately perpendicular to the medial line segment and spaced approximately evenly along the medial line segment; and
   determining a rate of variation along the medial line segment of a distance between the medial line segment and a nearby boundary line segment,
   wherein the slices are placed only if the rate of variation is less than a threshold rate.

6. A processing method for placing slices to partition a bounded two-dimensional area, the method comprising:
   determining a medial axis comprising at least one medial line segment approximately midway between two boundary line segments;
   placing the slices approximately perpendicular to the medial line segment and spaced approximately evenly along the medial line segment;
   determining a length of the medial line segment; and
   placing the slices only if the length is greater than a threshold length.

7. A processing method for placing slices to partition a bounded two-dimensional area, the method comprising:
   determining a medial axis comprising at least one medial line segment approximately midway between two boundary line segments; and
   placing the slices approximately perpendicular to the medial line segment and spaced approximately evenly along the medial line segment,
   wherein determining the medial axis comprises:
      determining a nearest boundary point outside the area corresponding to each point inside the area;
      finding adjacent points inside the area which have different corresponding nearest boundary points separated by at least a threshold arc length;

generating paths between said adjacent points with different corresponding nearest boundary points; and locating the medial axis from amongst the paths.

8. A method for processing points in a bounded area to locate a medial axis, the method comprising:

determining a nearest boundary point outside the area corresponding to each point inside the area;

finding adjacent points inside the area which have different corresponding nearest boundary points separated by at least a threshold arc length;

generating paths between said adjacent points with different corresponding nearest boundary points; and locating the medial axis from amongst said paths.

9. The processing method of claim 8, wherein the threshold arc length increases with increasing distance from the adjacent points to the nearest boundary points.

10. An electronically-implemented method for processing a bounded two-dimensional area in an array of points, the method comprising:

automatically processing interior points within the two-dimensional area making multiple passes over the interior points; and determining for each interior point, by way of the automatic processing, a coordinate of a nearest boundary point outside the area as measured by a Euclidean distance.

11. The method of claim 10, wherein the array of points comprises points for an image.

12. The method of claim 11, wherein the two-dimensional area comprises an exposed area.

13. The method of claim 10, the method further comprising:

determining a medial axis within the two-dimensional area by a procedure utilizing the coordinates of the nearest boundary points.

14. The method of claim 13, wherein the procedure includes finding adjacent interior points having different nearest boundary points.

15. The method of claim 10, wherein the automatic processing comprises:

a) storing boundary locations at boundary points adjacent to (but outside of) the two-dimensional area;

b) determining an interior point to be processed using a raster pattern moving in a first direction along a line and going from line to line in a second direction inside the two-dimensional area;

c) processing the interior point by
  i) considering a first boundary location stored at a first adjacent point (located opposite the first direction in relation to the interior point),
  ii) considering a second boundary location stored at a second adjacent point (located opposite the second direction in relation to the interior point),
  iii) determining a closer boundary location to be the second boundary location if the second boundary location is closer in Euclidean distance to the interior point and to be the first boundary location if the first boundary location is even closer in Euclidean distance to the interior point, and
  iv) storing the closer boundary location at the interior point, unless already stored at the interior point is a previously stored boundary location which is even closer than the closer boundary location; and d) repeating steps b) and c) until all interior points have been processed once;

e) reversing the first and second directions such that they are opposite of their former directions; and f) repeating steps b) through d) until all interior points have been processed twice.

16. The method of claim 15, further comprising:

g) changing the first and second directions by rotation in relation to the array of points; and h) repeating steps b) through f) until all interior points have been processed four times.

17. The method of claim 15, further comprising:

g) reversing the second direction; and h) repeating steps b) through f) until all interior points have been processed four times.

18. A processing method for partitioning a bounded area in an image into sub-areas, the method comprising:

determining pinch cuts located in narrow regions near rapid changes in area width;

partitioning the area into sub-areas separated by the pinch cuts;

determining a medial axis comprising at least one medial line segment approximately midway between two boundary line segments; and further partitioning the area into sub-areas by placing slice cuts approximately perpendicular to the medial line segment and spaced approximately evenly along the medial line segment.

19. The method of claim 18, further comprising:

determining if a sub-area is larger than a threshold area size; and if the sub-area is larger than the threshold area size, then partitioning the sub-area into roughly evenly sized parts.

20. An apparatus for processing an array of points, wherein the processing includes locating a medial axis in a bounded area within the array, the apparatus comprising:

an Euclidean processing module for determining a nearest boundary point outside the area corresponding to each point inside the area; and a medial axis module for finding adjacent points inside the area which have different corresponding nearest boundary points and using the adjacent points to locate the medial axis.

21. An apparatus for processing an array of points, wherein the processing includes processing a bounded two-dimensional area in the array of points, the apparatus comprising:

means for storing boundary coordinates at boundary points adjacent to two-dimensional area;

means for determining an interior point to be processed using a raster pattern moving in a first direction along a line and going from line to line in a second direction inside the two-dimensional area;

means for processing the interior point by
  i) considering a first boundary location stored at a first adjacent point (located opposite the first direction in relation to the interior point),
  ii) considering a second boundary location stored at a second adjacent point (located opposite the second direction in relation to the interior point),
  iii) determining a closer boundary location to be the second boundary location if the second boundary location is closer in Euclidean distance to the interior point and to be the first boundary location if the first boundary location is even closer in Euclidean distance to the interior point, and iv) storing the closer boundary location at the interior point, unless already stored at the interior point is a previously stored boundary location which is even closer than the closer boundary location; and means for reversing the first and second directions such that they are opposite of their former directions.

* * * * *